US010785371B2

(12) United States Patent
McCormack et al.

(10) Patent No.: US 10,785,371 B2
(45) Date of Patent: Sep. 22, 2020

(54) OPTIMAL RESOURCE AND CHANNEL SELECTION

(71) Applicant: Avaya Inc., Santa Clara, CA (US)

(72) Inventors: Tony McCormack, Galway (IE); David Skiba, Golden, CO (US); John H. Yoakum, Cary, NC (US)

(73) Assignee: Avaya, Inc., Santa Clara, CA (US)

( * ) Notice: Subject to any disclaimer, the term of this patent is extended or adjusted under 35 U.S.C. 154(b) by 12 days.

(21) Appl. No.: 14/976,050

(22) Filed: Dec. 21, 2015

(65) Prior Publication Data

US 2017/0180554 A1    Jun. 22, 2017

(51) Int. Cl.
    *H04M 3/00*           (2006.01)
    *H04M 3/51*           (2006.01)

(52) U.S. Cl.
    CPC ....... *H04M 3/5191* (2013.01); *H04M 3/5175* (2013.01)

(58) Field of Classification Search
    CPC .......................... H04M 3/5191; H04M 3/5175
    USPC ....... 379/265.01–265.14, 266.01–266.1, 309
    See application file for complete search history.

(56) References Cited

U.S. PATENT DOCUMENTS

| 7,136,448 | B1 * | 11/2006 | Venkataperumal | ..................... H04M 3/5166 379/265.02 |
| 8,885,812 | B2 * | 11/2014 | Margulies | ............... G06Q 30/02 379/265.02 |
| 9,665,547 | B1 * | 5/2017 | Eidelson | ............... G06F 16/954 |
| 9,785,619 | B1 * | 10/2017 | Hill | .................... G06F 16/9574 |
| 9,881,255 | B1 * | 1/2018 | Castellanos | ......... G06F 16/9574 |
| 10,089,579 | B1 * | 10/2018 | Hamon | ............... G06F 17/2235 |
| 2009/0274286 | A1 * | 11/2009 | O'Shaughnessy | ........................ H04M 1/72547 379/201.12 |
| 2010/0324961 | A1 * | 12/2010 | Singh | ................... G06Q 30/016 705/304 |
| 2012/0137201 | A1 * | 5/2012 | White | ................... G06F 16/957 715/205 |
| 2015/0032503 | A1 * | 1/2015 | Chander | ............ G06Q 30/0201 705/7.29 |
| 2015/0215463 | A1 * | 7/2015 | Shaffer | ............... H04M 3/5232 379/265.1 |
| 2015/0356568 | A1 * | 12/2015 | Milstein | ................. G06Q 30/01 705/304 |
| 2016/0042419 | A1 * | 2/2016 | Singh | ................. G06Q 30/0613 705/26.41 |
| 2016/0071126 | A1 * | 3/2016 | Chang | ................ G06Q 30/0255 705/7.31 |

(Continued)

*Primary Examiner* — William J Deane, Jr.

(57) ABSTRACT

A method, a device and a system selects an optimal resource and/or channel. The device of a contact center receives transaction data and interaction data corresponding to a transaction between the contact center and a user device. The transaction data includes one of a current resource being utilized for the transaction or a current channel indicating a communication channel being utilized for the transaction. The interaction data corresponds to interaction information of the current resource and the user device. The device generates a current score value of the transaction based on the transaction data and the interaction data. The device determines one of a further resource or a further channel to be used for the transaction based on the current score value and a predictive model. The predictive model defines relations between score values with the resources or the channels.

20 Claims, 4 Drawing Sheets

(56) References Cited

U.S. PATENT DOCUMENTS

| | | | |
|---|---|---|---|
| 2016/0078456 A1* | 3/2016 | Chakraborty | G06Q 30/0202 705/7.31 |
| 2016/0171508 A1* | 6/2016 | Fanous | G06F 17/30867 705/7.29 |
| 2016/0189030 A1* | 6/2016 | Jain | G06N 5/022 706/46 |
| 2017/0064083 A1* | 3/2017 | Gilbert | H04M 3/5141 |
| 2017/0310824 A1* | 10/2017 | Piaggio | H04M 3/5191 |

* cited by examiner

US 10,785,371 B2

OPTIMAL RESOURCE AND CHANNEL SELECTION

BACKGROUND

A contact center may be used by a provider to enable a variety of services for a user. In a first example, the contact center may process a transaction in which information or a service may be provided for a user requesting the transaction. That is, the contact center may be configured as an inbound contact center that responds to product/service support and/or information requests from users. In a second example, the contact center may contact the user to provide information such as products or advertisements that may be of interest to the user. That is, the contact center may be configured as an outbound contact center that operates for purposes such as telemarketing, solicitation, debt collection, market research, etc.

The contact center may utilize any type of communication medium to perform its operations. For example, the contact center may be configured to perform voice communications, video communications, chat communications, email communications, etc. Furthermore, the contact center may process the transaction using a variety of different resources in the different communication mediums. For example, the resources may include an automated response system, a live agent, a plurality of live agents, an inclusion of a supervisor, a combination thereof, etc.

During the course of processing the transaction, a customer journey may include a plurality of steps. For example, an initial interaction may be with the automated response system that gathers information. The system may transfer the transaction to an agent after the automated response system has completed its functionality to resolve the transaction. The agent may manually determine that a different agent in a different department may be required in continuing the processing of the transaction. Thus, the user may again be transferred to a further agent. The further agent may also manually determine whether a different step in the customer journey is required. During this process, the transaction may be processed through different communication media.

BRIEF SUMMARY

The exemplary embodiments are directed to a method, comprising: receiving, by an action model device of a contact center, transaction data and interaction data corresponding to a transaction between the contact center and a user device, the transaction data comprising one of a current resource of resources of the contact center being utilized for the transaction or a current channel of channels of the contact center indicating a communication channel being utilized for the transaction, the interaction data corresponding to interaction information of the current resource and the user device related to the transaction; generating, by the action model device, a current score value of the transaction based on the transaction data and the interaction data; and determining, by the action model device, one of a further resource of the resources or a further channel of the channels to be used for the transaction based on the current score value and a predictive model, the predictive model defining relations between score values with the resources or the channels.

The exemplary embodiments are directed to an action model device of a contact center, comprising: a transceiver communicating with a communications network to receive transaction data and interaction data corresponding to a transaction between the contact center and a user device, the transaction data comprising one of a current resource of resources of the contact center being utilized for the transaction or a current channel of channels of the contact center indicating a communication channel being utilized for the transaction, the interaction data corresponding to interaction information of the current resource and the user device related to the transaction; and a processor coupled to the transceiver that: generates a current score value of the transaction based on the transaction data and the interaction data; and determines one of a further resource of the resources or a further channel of the channels to be used for the transaction based on the current score value and a predictive model, the predictive model defining relations between score values with the resources or the channels.

DETAILED DESCRIPTION

Figure 1:
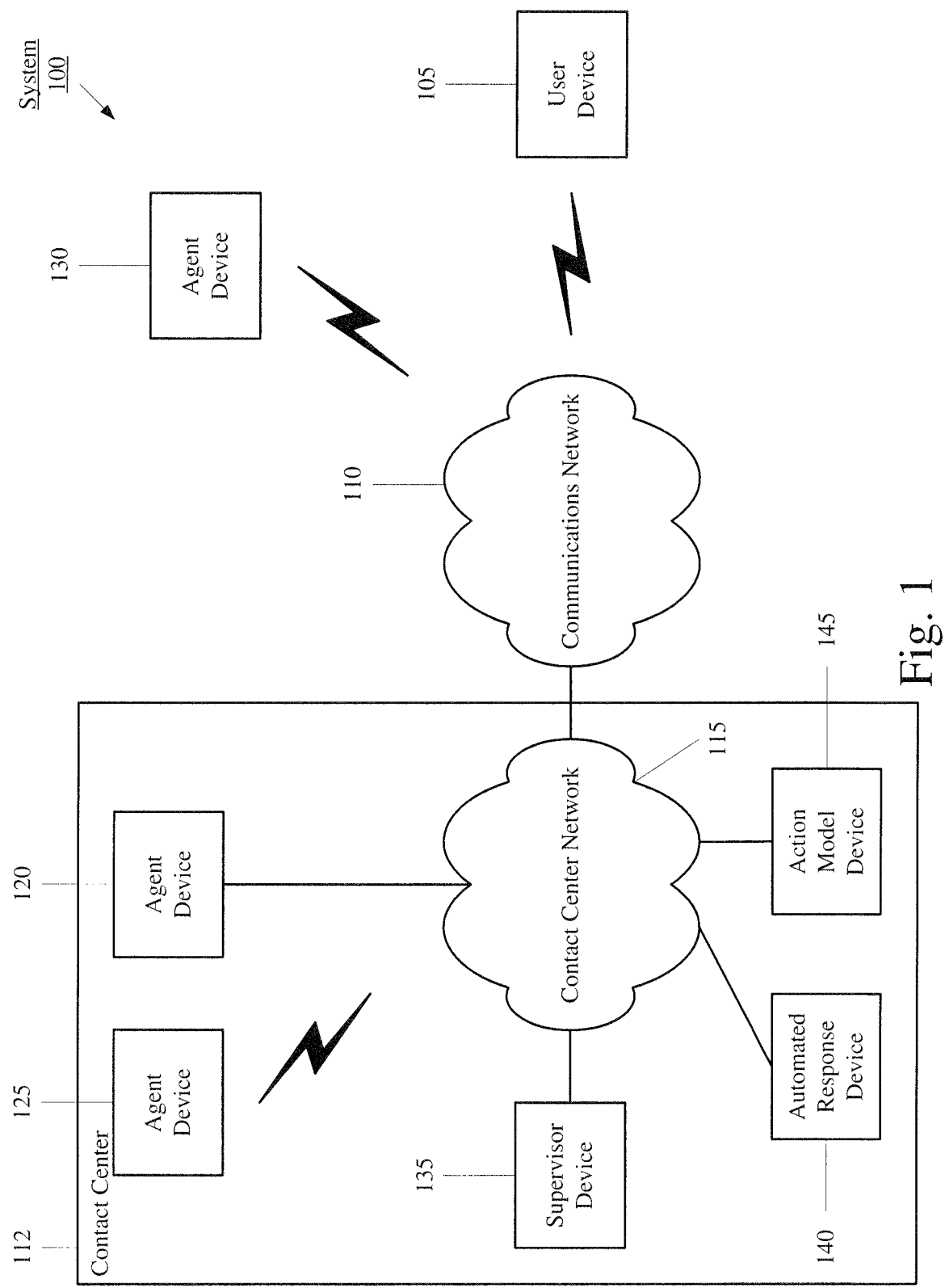
FIG. 1 shows an exemplary contact center system according to the present disclosure.

The exemplary embodiments may be further understood with reference to the following description and the related appended drawings, wherein like elements are provided with the same reference numerals. The exemplary embodiments are related to a device, a system, and a method for adaptively determining a resource and/or a channel upon which a transaction is to be processed. Specifically, the transaction may be part of a customer journey in resolving an objective associated with a user and a contact center. The resource, the channel, the transaction, the customer journey, and a related method will be described in further detail below.

The exemplary embodiments provide a mechanism in which a resource and/or a channel for a transaction being processed at a contact center are determined using transaction data and interaction data associated with the transaction. In the contact center, a user may have an objective to be resolved such as a product related servicing request, an information request, etc. In resolving the objective, the user may perform one or more transactions with the contact center, where each transaction may utilize one or more channels (e.g., chat, video, voice, etc.) and one or more services associated with the resources of the contact center (e.g., responses provided using an automated response, a live agent, etc.) where each service may be defined by a state indicating where the user is along the customer journey (e.g., the user is currently processing the transaction with an agent, the user is on hold waiting for an agent, etc.). A quality and an efficiency in resolving the objective hold a high priority for the contact center. With other considerations also being weighed (e.g., a resource commitment), achieving the correct balance between the channel and/or resource (e.g., automation and agent driven actions) may determine an outcome for the transaction and business level metrics. For example, while automated actions may be potentially limitless (and have lower costs), agent actions may be limited to a number of agents of the contact center (and have higher costs). As automation such as the automated response improves over the different channels (e.g., moving beyond merely an initial information gathering functionality), effective methods of managing the balance become more critical to the contact center as ad hoc or manual approaches would otherwise be utilized and increase associated costs (e.g., manual determinations and actions of an agent). Furthermore, the issue of properly selecting the channel/resource for the transaction is more acute for the user at a customer journey level as incorrect decisions along the customer journey result in a poor experience readily recognized by the user. Accordingly, the exemplary embodiments relate to selecting an optimal resource over an optimal channel to optimize the customer journey in resolving an objective.

It should be noted that the exemplary embodiments described herein relate to a process in which a further resource and a further channel are determined for use in continuing a processing of a transaction. As will be described below, the further resource and the further channel may be used as a basis to determine whether a current resource and a current channel are to be modified for use in processing a transaction. That is, the determined further resource and the determined further channel may indicate a change to both the current resource and the current channel, a change to only the current resource (i.e., the current channel continues to be used), a change to only the current channel (i.e., the current resource continues to be used), or a change to neither (i.e., the current resource and the current channel continue to be used). However, the determining of both the further resource and the further channel is only exemplary. The exemplary embodiments may also be configured for only a resource analysis being performed or only a channel analysis being performed. For example, when only the resource analysis is performed, the further resource may result in a change to the current resource or maintain use of the current resource. In another example, when only the channel analysis is performed, the further channel may result in a change to the current channel or maintain use of the current channel.

FIG. 1 shows an exemplary embodiment of a system 100 including a contact center 112 and channels for a user to communicate with the contact center 112. The system 100 may include a communications network 110 and a contact center communications network 115 which are communicatively connected to one another. Accordingly, a user device 105 connected to the communications network 110 may communicate with the contact center 112. The system 100 may enable the user device 105 utilized by a user to perform a transaction via the communications network 110 and the contact center network 115 to a resource of the contact center 112 so that a communication channel may be established therebetween in real-time or non-real-time for the transaction to be processed. That is, the transaction may relate to an inbound transaction originating from the user device 105 or an outbound transaction originating from the contact center 112. The resources of the contact center 112 may include a plurality of agent devices 120-130, a supervisor device 135, and an automated response device 140. Accordingly, the agent devices 120-130 and the supervisor device 135 may represent manually operated resources whereas the automated response device 140 may represent an automated resource. As will be described in further detail below, the system 100 may further include an action model device 145.

The user device 105 may enable a user to process a transaction with the contact center 112. Specifically, the user device 105 may establish a connection to the communications network 110 via a wireless connection or with a wired connection which is connected to the contact center network 115. Accordingly, the user device 105 may establish a connection with the contact center 112 to process the transaction. The user device 105 may represent any electronic device that is configured to perform the functionalities described herein. For example, the user device 105 may be a portable device such as a tablet, a smartphone, a laptop, etc. In another example, the user device 105 may be a client stationary device such as a desktop terminal. The user device 105 may include the necessary software, hardware, and/or firmware required to perform the processing of the transaction using the various channels available to the user device 105.

The channels in which to process the transaction may include real-time and non-real-time communication channels. For example, the real-time communication channels may be a voice only channel, a video channel, a text channel, etc. The non-real-time communication channels may be an email channel, a Web form channel, etc. Accordingly, if the user device 105 includes, for example, a microphone and a speaker, the voice only channel may be used. However, it is noted that the channels available to the user device 105 may be limited by the capabilities of the contact center 112 and vice versa or alternatively based on user preference. Thus, if the user device 105 is configured to perform all the non-real-time communication channels and only the voice only channel and the contact center 112 is configured for all communication channels, the user device 105 may process the transaction with the contact center 112 using a real-time communication channel via the voice only channel. If the user device 105 is configured for all communication channels and the contact center 112 is configured for only non-real-time communication channels, the user device 105 may be limited to only the non-real-time communication channels.

The communications network 110 may represent any single or plurality of networks used by the user device 105 to communicate with the contact center 112 via the contact center network 115. For example, if the user device 105 is a personal home computer, the communications network 110 may include a home network in which the user device 105 may initially connect. The home network may connect to a network of an Internet service provider to connect to the Internet. Subsequently, through the Internet, a connection may be established with the contact center network 115. It should be noted that the communications network 110 and all networks that may be included therein may be any type of network. For example, the communications network 110 may be a local area network (LAN), a wide area network (WAN), a virtual LAN (VLAN), a WiFi network, a HotSpot, a cellular network (e.g., 3G, 4G, Long Term Evolution (LTE), etc.), a cloud network, a wired form of these networks, a wireless form of these networks, a combined wired/wireless form of these networks, etc. The communications network 110 may also represent one or more networks that are configured to connect to one another to enable the data to be exchanged among the components of the system 100.

The contact center network 115 of the contact center 112 may enable a plurality of devices to be interconnected with one another, in particular the resources of the contact center 112. For example, the contact center network 115 may be a proprietary network accessible in one manner by the agent devices 120-130, the supervisor device 135, the automated response device 140, and the action model device 145. Specifically, the agent devices 120-130, the supervisor device 135, the automated response device 140, and the action model device 145 may be connected to the contact center network 115 via an authorized or privileged connection for select information and data to be accessed. However, as discussed above, the contact center network 115 may be accessed in another manner via the communications network 110 by the user device 105. This connection may enable communications to be transmitted and/or received between the end devices without access to the above noted information and data, particularly using the video communication.

The contact center network 115 may also enable direct connections thereto using, for example, both wired and wireless connections. Specifically, the agent device 120 may utilize a wired connection to establish the connection with the contact center network 115. The agent device 125 may utilize a wireless connection to establish the connection with the contact center network 115. Furthermore, the agent device 120 and the agent device 125 may be within a predetermined proximity of the contact center network 115 in order to establish the connection. Using an authorization procedure (e.g., login and password), the connection for the agent devices 120, 125 may be established. In addition, the contact center network 115 may enable remote connections thereto using, for example, the communications network 110. For example, an agent may work remotely from a location that is outside the proximity of the contact center network 115 such as the agent device 130. Using authentication, authorization, and accounting (AAA) procedures (via a AAA server), the agent device 130 may establish a connection with the contact center network 115 in a substantially similar manner as the agent devices 120, 125.

In view of the above description of the contact center network 115, it should be noted that the contact center network 115 may include a variety of components (not shown) to enable these functionalities. For example, the contact center network 115 may include a server, a router, a switch center, a network management arrangement, a database, etc. It should also be noted that the use of three agent devices 120-130 is only exemplary. Those skilled in the art will understand that the contact center may utilize any number of agent devices. It should further be noted that the use of one supervisor device 135 is only exemplary. Those skilled in the art will understand that the contact center may utilize any number of supervisor devices to manage one or more agent devices.

The different components used by users of the contact center 112 may include the agent devices 120-130 and the supervisor device 135. The agent devices 120-130 may be utilized by respective agents to process a transaction. In a substantially similar manner as the user device 105, the agent devices 120-130 may be configured to process the transaction using the one or more channels as defined by the contact center 112. The agent may subsequently use a process to determine a response or resolution for the transaction.

The supervisor device 135 may be utilized by a supervisor who is responsible for a plurality of agents such as those using the agent devices 120-130. The supervisor may be configured to monitor the actions performed by the agents as well as the processing of the transactions. The supervisor may notate along the monitoring process (e.g., notes related to a performance of the agent, notes related to a user reaction, etc.). In this manner, the supervisor may provide an indirect involvement with the transaction. Specifically, this indirect involvement may be a considered an exterior interaction to the transaction. When required, the supervisor may also participate in the processing of a transaction. For example, the transaction may require a special authorization that the agent is not enabled to provide and only the supervisor may provide. In another example, the transaction may require a supervisor intervention such as when the user becomes dissatisfied with the agent. In this manner, the supervisor may provide a direct involvement with the transaction.

The automated response device 140 may be a component of the contact center 112 that automatically generates an interaction in processing a transaction with the user of the user device 105. The automated response device 140 may also use the various channels that the contact center 112 is configured to use. For example, the automated response device 140 may utilize a voice only channel when the user device 105 establishes a connection with the contact center 112 using the voice only channel. In another example, the automated response device may utilize an email channel when the user device 105 transmits an email request or a Web form.

The interaction provided by the automated response device 140 may also vary based upon the progress of the transaction. In a first example, the automated response device 140 may be configured to provide an initial contact for the user device 105. Specifically, the automated response device 140 may request information regarding the transaction to be processed by the contact center. In this manner, identification of the user, a general or specific subject of the transaction, an account of the user, etc. may be provided by the user device 105 through the automated response device 140. In a second example, the automated response device 140 may be configured to provide responses to inquiries or requests from the user device 105. Specifically, the automated response device 140 may parse text or interpret vocal inputs from the user device 105 and determine the request. The automated response device 140 may utilize predetermined or dynamically generated responses that correspond to the determined request. With increased efficiency and improvement of the capabilities of the automated response device 140, the automated response device 140 may be utilized further prior to a need for a human component (e.g., an agent) to become involved.

The resources of the agent devices 120-130, the supervisor device 135, and the automated response device 140 may also determine the various services available to the user device 105 from the contact center 112. In a first example, a first service may be automated responses generated by the automated response device 140. In a second example, a second service may be human responses generated by an agent utilizing one of the agent devices 120-130. In a third example, a third service may be a plurality of human responses generated by a plurality of agents respectively utilizing the agent devices 120-130. In a fourth example, a fourth service may be human responses generated by a supervisor utilizing the supervisor device 135. In a fifth example, a fifth service may be a plurality of human responses generated by a plurality of supervisors using respective supervisor devices. In a sixth service, the sixth service may be a plurality of human responses by one or more agents and one or more supervisors. In a seventh service, the above services may incorporate the monitoring of the supervisor. Each of these services may utilize any of the channels described above including the non-real-time communication channels and the real-time communication channels.

The user using the user device 105 may exchange communications with the contact center 112 to process the transaction. The transaction may relate to an objective to be resolved for the user including an inbound transaction and an outbound transaction. When relating to the inbound transaction, the objective may be for a request of the user including product or service requests. When relating to the outbound transaction, the objective may be to provide information to the user and any follow-up communication such as product purchase and delivery. In the course of resolving the objective, the transaction may be utilized to complete an entirety of the objective or a portion of the objective. For example, the user may reach the contact center 112 using an inbound transaction to update information of an account via a voice only channel. The automated response device 140 may be configured to process the entire transaction and the entire objective. In another example, the user may reach the contact center 112 for an inbound transaction for a product-related service via a text channel. The automated response device 140 and subsequently an agent using one of the agent devices 120-130 may process the entire transaction and the entire objective. In a further example, the user may reach the contact center 112 for an inbound transaction for a product-related service via an email channel. The automated response device 140 may generate a response and transmit through the email channel. However, this may only provide a portion of the objective for the user. The user may perform a further inbound transaction with a follow-up request. The automated response device 140 may be incapable of generating the response and so an agent using one of the agent devices 120-130 may generate a response and transmit through the email channel. In this manner, the objective may have required more than one transaction in its resolution where each transaction provided a completion of a portion of the objective.

It should be noted that the course of resolving the objective may include different channels. For example, when the user reaches the contact center 112 via the email channel, the agent assigned to respond to the request may select to utilize a voice only channel instead. Thus, the resolution of the objective may entail one or more resources and one or more channels. It should again be noted that the course of resolving the objective may span over one or more transactions. For example, if only the email channel is used, the user may reach the contact center 112 on a first day, receive a response on a second day, reach the contact center 112 on a third day, receive a response on a fourth day, etc. until a resolution to the objective is reached.

Each step along the process in which the one or more transactions are processed and the objective is resolved may be represented as the customer journey. The customer journey may therefore include the one or more resources of the contact center 112 using the one or more channels. The customer journey may begin upon the user reaching the contact center 112 when related to an inbound transaction as the initial contact or upon the user being reached by the contact center 12 when related to an outbound transaction as the initial contact. The customer journey may conclude upon the objective being resolved. As noted above, the customer journey may include one or more transactions and thus may conclude with the initial contact transaction or a subsequent transaction.

Figure 2:
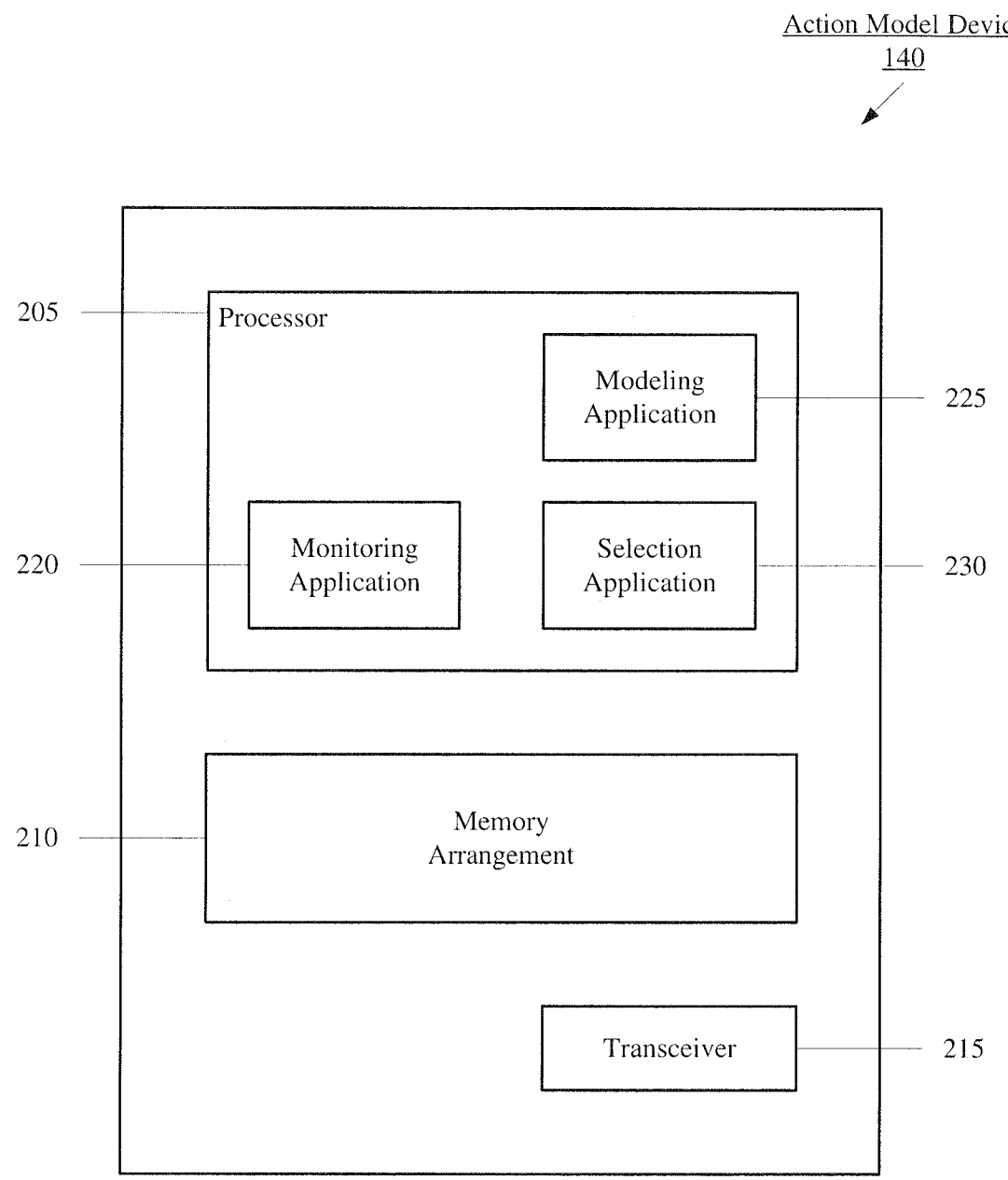
FIG. 2 shows an exemplary action model device of the contact center system of FIG. 1 according to the present disclosure.

Returning to the system 100 of FIG. 1, the contact center 112 may also include the action model device 145. FIG. 2 shows the exemplary action model device 145 of the contact center 112 in the system 100 of FIG. 1. The action model device 145 may provide a mechanism by which the resource and/or channel of the transaction to be processed in resolving an objective is determined in the customer journey. Those skilled in the art will understand that conventional processes in determining the resource and/or channel of the transaction is either dictated manually in an ad hoc manner, particularly when an agent is involved in the processing of the transaction. The action model device 145 may automatically determine the resource and/or the channel for the transaction. As will be described in further detail below, the determination of the resource and/or the channel may be automatically utilized or may be shown as a display (e.g., as a recommended resource or channel).

The action model device 145 may represent any electronic device that is configured to perform the functionalities described herein. As shown in FIG. 2, the action model device 145 may include a processor 205, a memory arrangement 210, and a transceiver 215. The processor 205 may execute a plurality of applications, the memory arrangement 210 may store data related to the applications, and the transceiver 215 may establish a connection to the contact center network 115. It should be noted that the action model device 145 may also include further components such as a display device and an I/O device that enable an administrator to configure the action model device 145 to perform its intended functionalities. However, it should also be noted that the action model device 145 may be configured to receive these instructions via the transceiver 215 to automatically implement the policies upon reception.

The processor 205 may be configured to execute a monitoring application 220. The monitoring application 220 may initially generate transaction data that indicates a current state of the transaction. As described above, the state may be indicative of where along the customer journey the user device 105 is currently located. For example, the state may be whether the user device 105 is currently having the transaction processed by the automated response device 140, whether the user device 105 is currently having the transaction processed by an agent, whether the user device 105 is waiting for an agent and/or a supervisor, whether the user device 105 is waiting for a further agent to join in processing the transaction, etc. In this manner, the transaction data may be indicative of a current resource being used in processing the transaction as well as a current channel being used. It should be noted that the transaction data may also include all of the states that the customer journey has undergone since starting. As will be described below, the past states may also influence the manner in which the subsequent applications are to operate.

The monitoring application 220 may also be used for further operations, particularly to track a resolution of an objective and the one or more transactions thereof. For example, the monitoring application 220 may track the user, the user device 105, any agent or supervisor that is participating in the transaction, the one or more resources being used in the one or more channels, the exchange between the user device 105 and the contact center 112 (e.g., a text analysis of a chat channel), etc. The monitoring application 220 may generate a corresponding interaction data to be used for subsequent operations. The interaction data may therefore include directly associated information related to information of the resource and the user device 105 that is entered/received for the purposes of resolving the objective of the transaction. For example, the interaction data may be the text data, the voice data, any associated video data, etc. exchanged between the resource and the user device 105. The interaction data may also include indirectly associated information that may be related to information of the resource and the user device 105 that is monitored during the resolving of the objective of the transaction. For example, the interaction data may be device activity of the user device 105 and/or the resource (e.g., Internet or mobile activity), customer information such as a customer profile, supervisor notes from a monitoring by the supervisor, etc. The interaction data may further incorporate resource analysis. For example, the interaction data may be resource levels (e.g., availability), service levels (e.g., availability), analysis of customer sentiment, analysis of agent proficiency, analysis of agent capability (e.g., types of transactions that the agent is capable of handling), etc. In this manner, the interaction data may measure all related information of the transaction of the customer journey in resolving the objective.

The processor 205 may also be configured to execute a modeling application 225. The modeling application 225 may utilize a predictive model based upon the transaction data and the interaction data for a current state of the transaction to determine the resource and/or channel to be used in continuing the processing of the transaction and/or resolving the objective. The modeling application 225 may also utilize other sources of information. For example, customer journeys of other completed objective resolutions performed by the contact center 112 may be used, particularly a past resolution involving the user device 105 or attributes associated with the user device 105, a past resolution involving similar issues with this user or other users, a past resolution involving other transactions or other customer journeys.

As described above, the customer journey may represent interactions between the user device 105 and the resources of the contact center 112 over the different communication channels. Therefore, the customer journey may be modeled as a multi-channel, multi-turn dialog where resources are dynamically utilized toward the resolution of the objective. The modeling application 225 may provide the different analytical mechanisms in determining the next step (e.g., a subsequent action) along the customer journey. For example, the analytical mechanism may utilize a predictive scoring and a predictive model. Using the transaction data and the interaction data as determined by the monitoring application 220, the modeling application 225 may generate a corresponding predictive score value. The predictive score value may include a corresponding output from the predictive model that indicates the subsequent action to be taken in the customer journey. In a first manner of using the predictive model and the predictive score, the predictive model may enable the transaction data and the interaction data to be used in generating the predictive score where the predictive model has all possible actions including the resource(s) to be used and/or the channel in which to process the transaction that may be selected. In a second manner of using the predictive model and the predictive score, the predictive model may be filtered using the transaction data. The transaction data may limit the number of actions that may be utilized along the customer journey such as eliminating channels that are unavailable. The predictive score value may therefore be determined using this filtered selection. In a third manner, the predictive score may be determined from the transaction data and/or the interaction data including specific information. For example, the transaction data may indicate a voice communication between the user of the user device 105 and the agent of the agent device 120, but the interaction data may indicate an escalation parameter detected from a voice being raised beyond a predetermined decibel level. Upon the interaction data including such information, the predictive score may be selected immediately such that the outcome from the predictive model indicates an involvement of the supervisor. The outcome may also indicate that the agent device 120 is still to be used and the transaction is to continue to use the voice communication.

As noted above, the predictive model and the predictive score may be used for a variety of predictive analyses such that information surrounding the transaction including the transaction data and the interaction data may be used to determine what channel(s) and/or which resource(s) are to be used in continuing the customer journey for the transaction. According to an exemplary embodiment, the predictive model may be generated based upon the transaction data and the interaction data of a given transaction or interaction between the contact center 112 and the user device 105. For each transaction or interaction, the predictive model may be utilized to determine the proper or optimal channel(s) and/or resource(s) using a resulting predictive score that is generated based upon the transaction data and the interaction data. According to this exemplary embodiment, the predictive model may be used in calculating a probability based on the predictive score of whether an option for the channel(s) and/or resource(s) is optimal. For example, a 0 to 100 scale may be used in which the predictive score fed into the predictive model for a particular channel/resource selection results in a probability value. Thus, the predictive score and the predictive model may be used in determining which one of the probability values corresponding to the channel/resource selections is highest. The channel/resource selection corresponding to the highest probability value may indicate which of the channel/resource selections is likely to be proper or optimal for use in the transaction.

In analyzing the probability values and when multiple channel/resource selections have probability values that are substantially similar, the action model device 145 may determine which of the options to ultimately utilize (or recommend). For example, if one of the determined optimal options of the channel/resource selection utilizes the channel and/or the resource as indicated in the transaction data, this option may provide a smallest change in the processing of the transaction/interaction between the contact center 112 and the user device 105. Another one of the determined optimal options of the channel/resource selection may utilize entirely different channels and resources than those indicated in the transaction data. Such an option may provide a largest change in the processing of the transaction/interaction that the action model device 145 may determine such a change may result in a poor user experience. Therefore, the action model device 145 may select the channel/resource selection that is of a smallest change when multiple optimal options are determined.

In determining the predictive score for the transaction data and the interaction data, the predictive score may be generated based upon predictors in the transaction data and the interaction data. With regard to transactions and interactions between the contact center 112 and the user device 105, the predictors may include any of the above noted examples of information associated with the transaction, information associated with the customer, information of historical data of transactions and interactions performed by the contact center 112, information of historical data of transactions and interactions performed by other contact centers, information of resource/channel usage at the contact center 112, external data such as indirectly associated data, etc. The predictors may accordingly be used in generating the predictive score representing the known information for the transaction/interaction such that the predictive score being fed into the predictive model results in the above described probability values for a given resource/channel selection. In this manner, the predictive model may define relations between the predictive scores with the resources and channels available at the contact center 112.

It is noted that in determining the subsequent action, the modeling application 225 may perform a variety of different operations to output a recommendation to the selection application 230. As noted above, the recommendation that is output may indicate how the customer journey is to continue. Therefore, the recommendation may be a change to the resource, a change to the channel, a change to both the resource and the channel, or no change to both the resource and the channel (i.e., continue to use the resource/channel currently in use and indicated in the transaction data). In determining which of these types of recommendations is output, the modeling application 225 utilizes the transaction data including the current resource/channel to determine a further resource/channel that is to be used. By analyzing whether is a change to the resource and whether there is a change to the channel, the recommendation may be output accordingly. For example, the current resource may be an agent device while the channel is over a voice communication. In a first analysis, the modeling application 225 may determine that the further resource is the same agent device and the further channel is the same voice communication. Accordingly, the recommendation that is output is that there should be no change. In a second analysis, the modeling application 225 may determine that the further resource is the automated response device 140 but the further channel is the same voice communication. Accordingly, the recommendation that is output is that there should be a change to the resource only and a description of the change. In a third analysis, the modeling application 225 may determine that the further resource is the same agent device but the further channel is a text communication. Accordingly, the recommendation that is output is that there should be a change to the channel only and a description of the change. In a fourth analysis, the modeling application 225 may determine that the further resource is the automated response device 140 and the further channel is the text communication. Accordingly, the recommendation that is output is that there should be a change to both the resource and the channel along with a description of the change.

It should be noted that the states upon which the predictive score and the predictive model may determine the resource/channel may result in a different state or may remain the same state. When resulting in a different state such as a different resource (or group of resources that may or may not include the current resource) and/or a different channel is to be used, the model/score may eliminate a linear processing of the customer journey in which a set of states are to be used in a predetermined order. That is, the exemplary embodiments enable a hopping feature between states that utilize an optimal resource/channel combination along each step of the customer journey.

It should also be noted that predictive score and the predictive model may be further influenced by the transaction data when including past states that the customer journey has already utilized. For example, if the past states indicate a high number of uses of the automated response device 140, the values used in determining the predictive score may be weighted such that another predictive score value indicating the use of the automated response device 140 may be avoided from being calculated as the transfer of the transaction to a human resource may be more optimal for this customer journey. The weighting of the values used in determining the predictive score based upon the past states is only exemplary and may also represent another mechanism by which the predictive model/predictive score may be used by the exemplary embodiments.

It should further be noted that the predictive model may be developed in a variety of ways. Again, as noted above, the predictive model may be developed based upon various sources of information. The predictive model may be predetermined and used for the transactions processed by the contact center 112 or may be developed for a given transaction. That is, a general predictive model may be used for the contact center 112 or a specified predictive model may be used that also incorporates specifying information such as the customer profile. The predictive model may also be developed through various operations. In a first example, the predictive model may be developed using neural networks. In a second example, the predictive model may be developed using Bayesian methods of probability and statistics.

Those skilled in the art will understand that the predictive model may be generated using various inputs and known information. For example, the predictive model may be developed based on insight of the business upon which the contact center 112 is utilized, developed based on machine learning techniques, a combination thereof, etc. The predictive score values may also be generated based on similar developmental techniques. Accordingly, the exemplary embodiments may utilize any model/score analysis in determining the resource/channel to be used in a subsequent step along the customer journey.

It should additionally be noted that the use of the predictive model and the predictive score to determine the subsequent action is only exemplary. The exemplary embodiments may further utilize other forms of predictive analytics in determining the subsequent action. For example, the exemplary embodiments may also utilize data mining methods. Specifically, the data mining method may entail determine patterns from large data sets such as the insight of the business, stored information of previous transactions, stored information of previous decisions and results therefrom, a combination thereof, etc.

As discussed above, the modeling application 225 may be configured to generate the subsequent action including the resource and/or the channel that is to be used in continuing the processing of the transaction. The modeling application 225 may perform this operation at a variety of different times. Specifically, the score may be generated at these various different times. In a first example, the modeling application 225 may continuously monitor the transaction and receive updated transaction data and updated interaction data such that a score is continuously generated and a corresponding action is continuously determined. In a second example, the modeling application 225 may monitor the transaction and receive updated transaction data and updated interaction data at predetermined intervals such that a score is generated at these predetermined intervals and a corresponding action is determined. In a third example, the modeling application 225 may monitor the transaction and receive updated transaction data and updated interaction data to generate a score upon a triggering event. For example, the triggering event may be a deviation from an expected parameter included in the interaction data such as an expected decibel level range of voices in a voice communication. In a fourth example, the modeling application 225 may generate the score using any combination of the above times.

The processor 205 may further be configured to execute a selection application 230. The selection application 230 may determine how the outcome of the modeling application 225 is to be used. With the monitoring application 220 continuously tracking the process of the resolution of the objective through generating the transaction data and the interaction data, the modeling application 225 may also continuously generate a result for the resource/channel to be used. The selection application 230 may then determine whether to automatically apply the result or generate a display of the result if a decision is to be made as to adopting the result. As discussed above, the modeling application 225 may determine the outcome at a variety of times. The modeling application 225 may accordingly provide the outcome to the selection application 230 based upon the timing utilized by the modeling application 225. For example, the modeling application 225 may provide the outcome to the selection application 230 whenever a change in the score is determined.

With regard to implementing the outcome, when the selection application 230 determines that the transaction is being processed by the automated response device 140, the selection application 230 may determine that the result (e.g., transfer to agent and continue using current channel) is to be automatically adopted. When the selection application 230 determines that the transaction is being processed by at least one agent or supervisor, the selection application 230 may determine that the result is to be provided as a display. The human resource may then select whether the result is to be adopted or ignored. In this manner, the action model device 145 may not necessarily pull the transaction away (e.g., inadvertently) from the agent.

It should be noted that the above noted applications each being an application (e.g., a program) executed by the processor 205 is only exemplary. The functionality associated with the applications may also be represented as components of one or more multifunctional programs, a separate incorporated component of the action model device 145 or may be a modular component coupled to the action model device 145, e.g., an integrated circuit with or without firmware.

Figure 3:
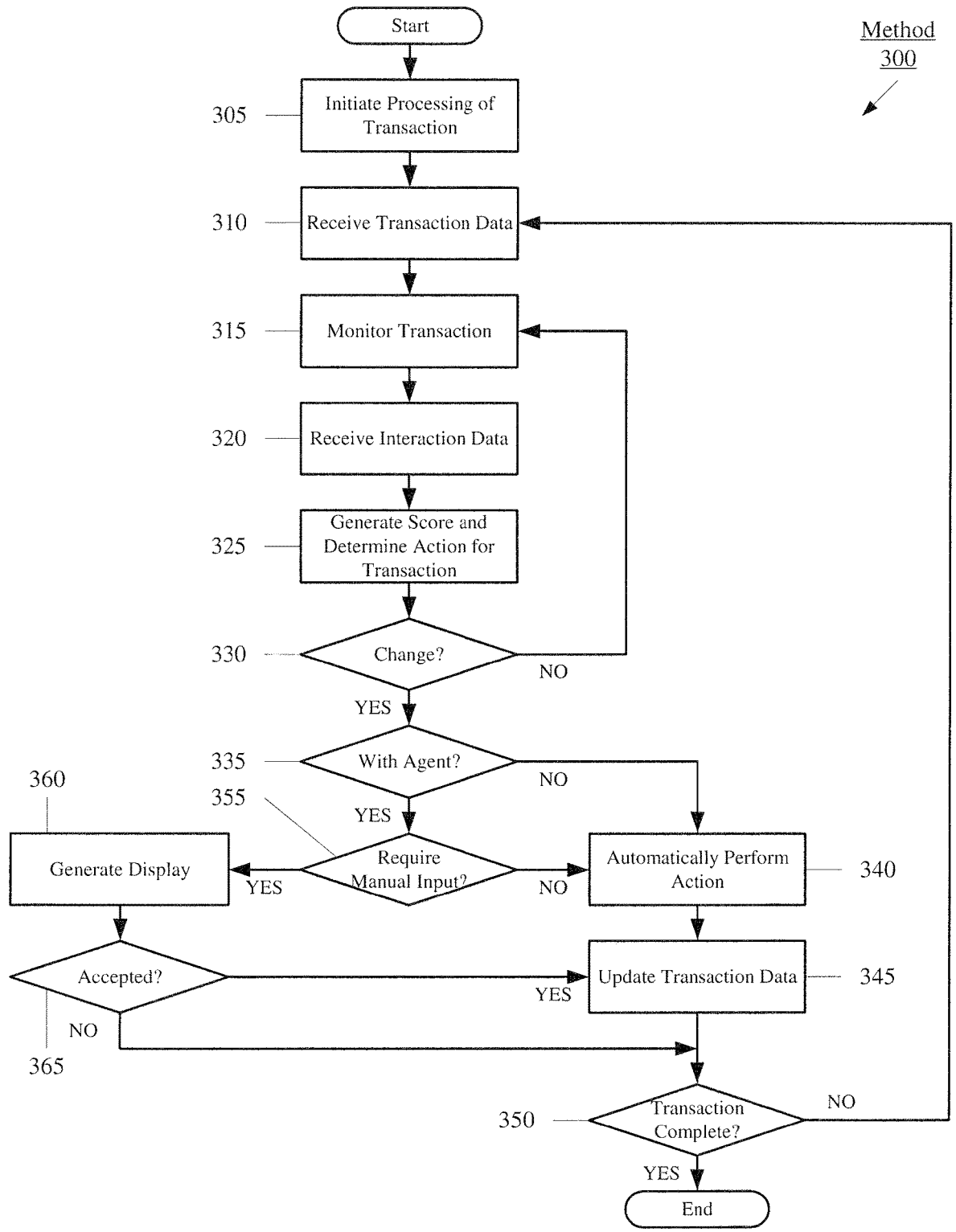
FIG. 3 shows an exemplary method for determining an action for a customer journey according to the present disclosure.

FIG. 3 shows an exemplary embodiment of a method 300 for determining a resource and a channel to be used in processing a transaction along a customer journey according to the present disclosure. Specifically, the method 300 may relate to the action model device 145 determining the resource/channel as well as the manner of adoption of the determined resource/channel. The method 300 will be described with regard to the system 100 of FIG. 1 and the action model device 145 of FIG. 2.

In step 305, the processing of the transaction is initiated between the user device 105 and a resource of the contact center 112. As described above, the transaction may be an outbound transaction. Accordingly, the transaction may be initiated upon the resource of the contact center 112 (e.g., one of the agent devices 120-130 or the automated response device 140 that may include an automated dialing functionality) contacting the user device 105 and establishing a communication therebetween. The transaction may also be an inbound transaction. Based upon the manner in which the contact center 112 is configured to handle inbound transactions, the user device 105 may be directed to one of the resources. For example, the initial resource may be the automated response device 140 that receives information of the user. In another example, the initial resource may be one of the agent device 120-130.

In step 310, the action model device 145 receives the transaction data. Specifically, the monitoring application 220 may generate the transaction data and the modeling application 225 may receive the transaction data. As described above, the transaction data may indicate the current resource and the current channel that are being used in processing the transaction. As noted above, the transaction data may also include past states that the customer journey has used. At this point along the method 300, the customer journey has just begun such that the transaction data may include only the current resource/channel. In step 315, the action model device 145 monitors the transaction. Specifically, the monitoring application 220 may perform the monitoring operation. As discussed above, the monitoring operation may be performed in a continuous manner, at predetermined intervals, upon a triggering event, etc. In this manner, in step 320, the action model device 145 may receive further information (e.g., the interaction data). Specifically, the monitoring application 220 may generate the interaction data and the modeling application 225 may receive the interaction data. As discussed above, the interaction data may incorporate any data (outside what is included in the transaction data) associated with the transaction including directly associated data related to the channel (e.g., text data, voice data, video data), indirectly associated data (e.g., a device activity, customer data, an available resource level, an available service level, an analysis of customer sentiment, an analysis of agent proficiency, an analysis of agent capability).

In step 325, the action model device 145 generates a predictive score value based upon the transaction data and the interaction data to determine the action including the resource and the channel to be used for the transaction based upon a predictive model. As described above, the predictive model may be developed using an insight of a business to which the contact center is associated, machine learning techniques, etc. and developed as a generic model or an ad hoc model for the current customer journey. Also described above, the predictive score value may be determined based upon a variety of factors and may also be predetermined such as a specified indication being included (e.g., when supervisor intervention is required). It should again be noted that the use of the predictive score and the predictive model may represent any mechanism in which a comparable score/model functionality is used. It should also again be noted that the use of the score/model is only exemplary and any analysis mechanism may be used in determining the subsequent resource/channel to be used in processing the transaction. An exemplary embodiment of how the predictive score, the predictive model, and an outcome therefrom will be described in further detail below with regard to FIG. 4.

In step 330, the action model device 145 determines whether the action that is determined is a change from the current resource/channel. If there is no change, the action model device 145 returns the method 300 to step 315 and continues to monitor the transaction. If the action indicates a change to the resource and/or channel to be used, in step 335, the action model device 145 determines whether the transaction is currently being processed by an agent. Specifically, the action model device 145 determines whether the transaction that is performed over a real-time communication channel is currently being processed by a human component of the contact center 112 such as an agent and/or the supervisor.

If the action model device 145 determines that the transaction is not being performed by an agent, the action model device 145 continues the method 300 to step 340. This determination may also relate to whether the communication channel is in real-time or non-real-time such that the action model device 145 continues to step 340 when the transaction is in non-real-time. In step 340, the action model device 145 signals for the determined action to be performed automatically without any intervention. That is, the transaction is transferred accordingly to the determined resource and/or channel. Subsequently, in step 345, the action model device 145 updates the parameters of the transaction data to reflect this change. In step 350, the action model device 145 determines whether the transaction is complete. If incomplete, the action model device 145 returns the method 300 to step 310.

Returning to step 335, if the action model device 145 determines that the transaction is with an agent (and also being performed in a real-time communication channel), the action model device 145 continues the method 300 to step 355. In step 355, the action model device 145 determines whether the determined action requires a manual input. For example, the action may be a transfer of the transaction from an agent to the automated response device 140. Such an action may require the agent to approve the transfer so that the transaction is not pulled away from the agent early inadvertently. In another example, the action may be an observation or barge-in of a supervisor. Such an action may require an automatic adoption of the action without any intervention from the agent. If the action model device 145 determines that there is no manual input needed for the determined action, the action model device 145 continues the method 300 to step 340. If the action model device 145 determines that there is a need for a manual input, the action model device 145 continues the method 300 to step 360. In step 360, the action model device 145 generates display data reflecting the determined action and transmits the display data to the agent for display on a display device on the corresponding agent device. It should be noted that the agent in this description of the method 300 may represent any manually operated resource. In step 360, the action model device 145 determines whether the result has been accepted. If accepted, the action model device 145 continues the method 300 to step 345. However, if rejected, the action model device 145 continues the method 300 to step 350.

Figure 4:
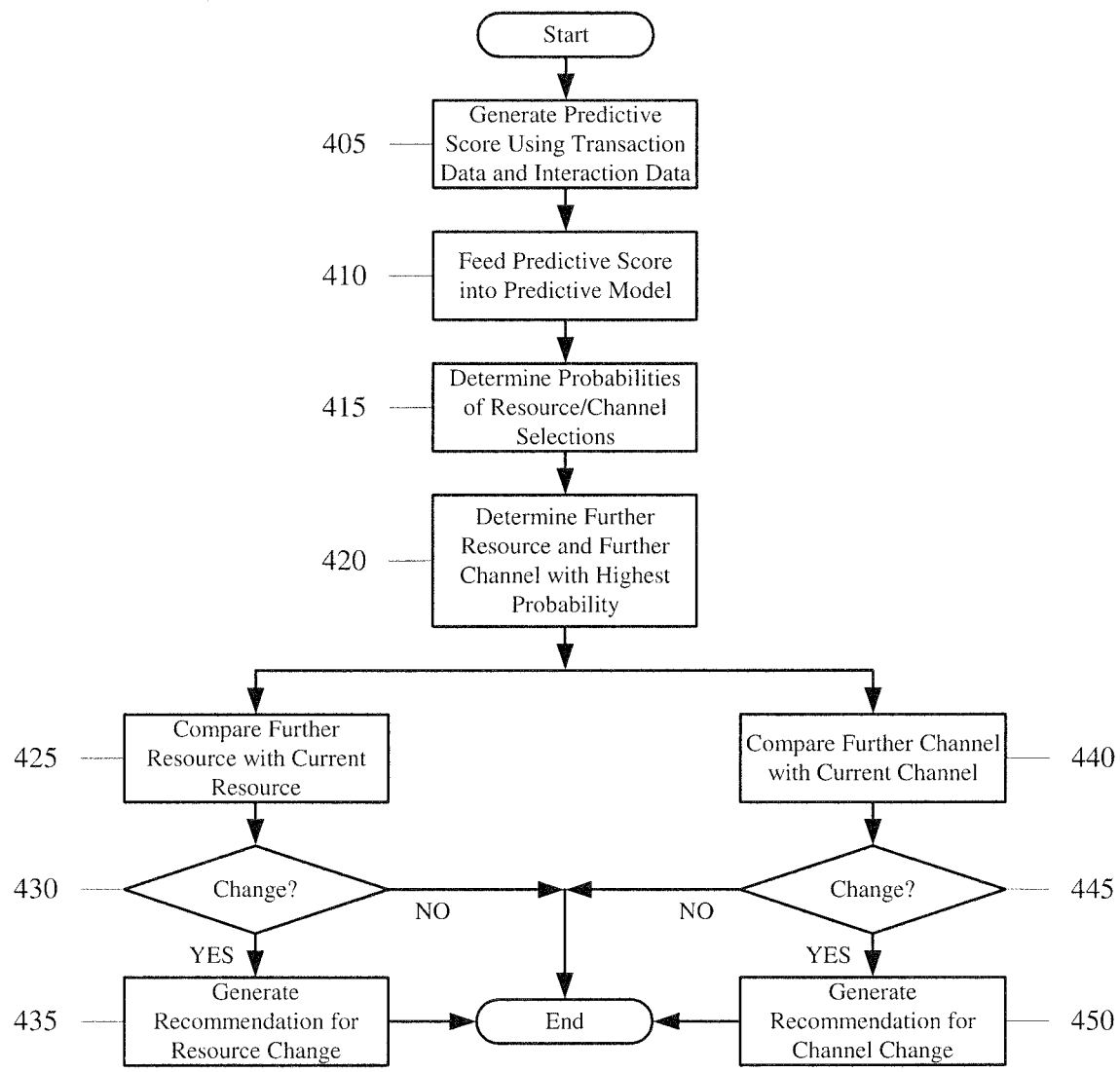
FIG. 4 shows an exemplary method for determining an outcome based upon a predictive score and a predictive model according to the present disclosure.

FIG. 4 shows an exemplary embodiment of a method 400 for determining an outcome based upon a predictive score and a predictive model according to the present disclosure. As described above, step 325 of the method 300 may relate to this functionality of the action model device 145. The method 400 may relate to a particular embodiment in which the predictive score and the predictive model may be used. Therefore, the method 400 is described herein with further details upon which step 325 may be performed. However, it should again be noted that the method 400 is only exemplary and the exemplary embodiments may utilize any predictive analysis operation to perform the functionalities of the action model device 145. The method 400 may also relate to a mechanism to generate an outcome by the modeling application 225 that is provided to the selection application 230 in order for the selection application 230 to perform its functionality (e.g., steps 335-350 of the method 300). The method 400 will be described with regard to the system 100 of FIG. 1 and the action model device 145 of FIG. 2.

The action model device 145 may have already received the transaction data and the interaction data. Thus, in step 405, the action model device 145 generates the predictive score using the transaction data and the interaction data. Specifically, predictors within the transaction data and the interaction data may be used in generating the predictive score. As described above, the predictors may be any information that may be considered including directly related information (e.g., text exchanged between the user device 105 and the resource of the contact center 112) and indirectly related information (e.g., supervisor monitoring, research performed by the agent device, etc.).

In step 410, the action model device 145 feeds the predictive score into the predictive model. As noted above, the predictive model may track relations between score values with the resources and the channels of the contact center 112. In step 415, the probabilities of different resource/channel selections may be calculated based upon the predictive score and the predictive model. For example, the predictive score incorporating the transaction data and the interaction data may be used with the predictive model to determine a probability for a particular combination of resource/channel (e.g., a resource to be used includes an agent device and a supervisor device while the channel to be used includes a voice communication and an email communication). By calculating the different probabilities for the various resource/channel selections, in step 420, the action model device 145 determines a further resource and a further channel having the highest probability.

It should again be noted that the exemplary embodiments may only determine only the further resource or only the further channel with the highest probability. Thus, the method 400 relating to a process in which both the further resource and the further channel is only exemplary. When only the further resource or only the further channel is being determined, the transaction data may include only the corresponding type of data. For example, if determining only the further resource, the transaction data may include only the current resource. However, this is only exemplary as the current resource and the current channel may be used in determining the further resource.

As discussed above, the method 400 may include further steps such as when there is more than one resource/channel selection having a highest calculated probability that is substantially similar. The method 400 may include these further steps that analyze which of the resource/channel selections may be more optimal than another. As described above, such an analysis may include determining the resource/channel selection having a smallest change from the current resource and the current channel as indicated in the transaction data.

In step 425, the action model device 145 compares the determined further resource with the current resource. In step 430, the action model device 145 determines whether there is a change between the determined further resource from the current resource. As described above, the predictive score and the predictive model may ultimately determine that the current resource or resources being used remains the optimal resource or resources to continue the processing of the transaction/interaction. If there is no change, the method 400 ends but continues with the functionalities of the selection application 230 as performed in steps 335-350 of the method 300. If there is a change, the action model device 145 continues the method 400 to step 435 to generate a recommendation for the resource change. The recommendation may be a replacement instruction to replace the current resource with the further resource. For example, the replacement instruction may indicate a replacing, an addition, or a subtraction. As described above, the modeling application 225 may output the recommendation that is provided to the selection application 230.

When the further resource and the further channel with the highest probability is determined (in step 420), the action model device 145 may also analyze the channel in serial to the resource analysis or in parallel thereto. In step 440, the action model device 145 compares the determined further channel with the current channel. In step 445, the action model device 145 determines whether there is a change between the determined further channel from the current channel. If there is no change, the method 400 ends but continues with the functionalities of the selection application 230 as performed in steps 335-350 of the method 300. If there is a change, the action model device 145 continues the method 400 to step 450 to generate a recommendation for the channel change. As described above, the modeling application 225 may output the recommendation that is provided to the selection application 230. The recommendation may be a replacement instruction to replace the current channel with the further channel. For example, the replacement instruction may indicate a replacing, an addition, or a subtraction. The recommendation may accordingly be used by the selection application 230 when there is at least one change to the current resource/channel selection.

It should again be noted that the change to the current resource and/or the current channel may entail a variety of different types of changes. Specifically, there may be no change, a change to the resource, a change to the channel, or a change to both the resource and the channel. Furthermore, when there is a change, the change may be a replacement, an addition, or a subtraction. For example, when there is currently a single resource being used for the transaction/interaction, the change may be that the single resource (e.g., an agent device) be replaced by a different resource (e.g., a different agent device, a supervisor device, an automated device, etc.) or an additional resource is added to the transaction/interaction. In another example, when there is currently multiple resources being used, the change may be that at least one of the multiple resources (e.g., an agent device and a supervisor device) be replaced (e.g., replace the agent device with the automated device), an additional resource is added to the transaction/interaction (e.g., the agent device, the supervisor device, and a further agent device), or at least one of the multiple resources is to be removed (e.g., remove the supervisor device).

The exemplary embodiments provide a device, system, and method of determining an action to be used in processing a transaction in resolving an objective. The action may indicate the resource of a contact center that is to be used in continuing a processing of a transaction as well as a channel to be used by this resource. In this manner, the customer journey in resolving an objective utilizes an optimal resource and an optimal channel given all available information surrounding the resolution of the objective including those of the user, the user device, and the resources of the contact center.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation. Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
receiving, by an action model device of a contact center, transaction data and interaction data corresponding to a transaction between the contact center and a user device, the transaction data comprising a current resource of resources of the contact center being utilized for the transaction or a current channel of channels of the contact center indicating a communication channel being utilized for the transaction, the interaction data corresponding to interaction information of the current resource and the user device related to the transaction;
generating, by the action model device, a predictive score value of the transaction based on the transaction data and the interaction data; and
determining, by the action model device, a further resource of the resources or a further channel of the channels to be used for the transaction using a predictive model that is fed the predictive score value, wherein the predictive model tracks relations between predictive score values and the resources and the channels of the contact center to provide output indicative of the further resource or the further channel corresponding to the predictive score value in response to being fed the predictive score value.

2. The method of claim 1, wherein the generating, by the action model device, the predictive score value comprises generating the predictive score value either continuously, at a predetermined time interval, upon a triggering event occurring, or a combination thereof.

3. The method of claim 1, wherein when the determining, by the action model device, is the further resource, the method further comprises:
 comparing, by the action model device, the further resource with the current resource; and
 if the further resource is different from the current resource, generating, by the action model device, a recommendation data comprising a replacement instruction of the current resource with the further resource.

4. The method of claim 1, wherein when the determining, by the action model device, is the further channel, the method further comprises:
 comparing, by the action model device, the further channel with the current channel; and
 if the further channel is different from the current channel, generating, by the action model device, a further recommendation data comprising a further replacement instruction of the current channel with the further channel.

5. The method of claim 1, wherein the interaction data comprises directly associated data that comprises communication data related to utilization of the current channel, and wherein a type of the communication data comprises one of text data, voice data, video data, and a combination thereof.

6. The method of claim 1, wherein the interaction data comprises indirectly associated data that comprises data related to one of device activity, customer data associated with the user, an available resource level, an available service level, an analysis data of customer sentiment, an analysis data of agent proficiency, an analysis data of agent capability, and a combination thereof.

7. The method of claim 1, further comprising:
 selecting, by the action model device, a first selection comprising a first resource selection of the resources or a first channel selection of the channels; and
 determining, by the action model device, a first probability value, included in the output, indicative of whether the first selection is an optimal selection to be used for the transaction.

8. The method of claim 7, further comprising:
 selecting, by the action model device, a second selection comprising a second resource selection of the resources or a second channel selection of the channels; and
 determining, by the action model device, a second probability value, included in the output, indicative of whether the second selection is the optimal selection to be used for the transaction.

9. The method of claim 8, further comprising:
 if the first probability value is greater than the second probability value, generating, by the action model device, an indication data that is indicative of the first selection being the optimal selection,
 wherein the first resource selection is the further resource or the first channel selection is the further channel.

10. The method of claim 1, wherein the resources comprise one of an automated response device, an agent device, a plurality of agent devices, a supervisor device, a plurality of supervisor devices, or a combination thereof.

11. An action model device of a contact center, comprising:
 a transceiver communicating with a communications network to receive transaction data and interaction data corresponding to a transaction between the contact center and a user device, the transaction data comprising a current resource of resources of the contact center being utilized for the transaction or a current channel of channels of the contact center indicating a communication channel being utilized for the transaction, the interaction data corresponding to interaction information of the current resource and the user device related to the transaction; and
 a processor coupled to the transceiver that:
  generates a predictive score value of the transaction based on the transaction data and the interaction data; and
 determines a further resource of the resources or a further channel of the channels to be used for the transaction using a predictive model that is fed the predictive score value, wherein the predictive model tracks relations between predictive score values and the resources and the channels of the contact center to provide output indicative of the further resource or the further channel corresponding to the predictive score value in response to being fed the predictive score value.

12. The action model device of claim 11, wherein the processor generates the current score either continuously, at a predetermined time interval, upon a triggering event occurring, or a combination thereof.

13. The action model device of claim 11, wherein when the processor determines the further resource, the processor further:
 compares the further resource with the current resource; and
 if the further resource is different from the current resource, generates a recommendation data comprising a replacement instruction of the current resource with the further resource.

14. The action model device of claim 11, wherein when the processor determines the further channel, the processor further:
 compares the further channel with the current channel; and
 if the further channel is different from the current channel, generates a further recommendation data comprising further a replacement instruction of the current channel with the further channel.

15. The action model device of claim 11, wherein the interaction data comprises directly associated data that comprises communication data related to utilization of the current channel, and wherein a type of the communication data comprises one of text data, voice data, video data, or a combination thereof.

16. The action model device of claim 11, wherein the interaction data comprises indirectly associated data that comprises data related to one of device activity, customer data associated with the user, an available resource level, an available service level, an analysis data of customer sentiment, an analysis data of agent proficiency, an analysis data of agent capability, or a combination thereof.

17. The action model device of claim 11, wherein the processor further:

selects a first selection comprising a first resource selection of the resources or a first channel selection of the channels; and determines a first probability value, included in the output, that the first selection is an optimal selection to be used for the transaction.

18. The action model device of claim 17, wherein the processor further:

selects a second selection comprising a second resource selection of the resources or a second channel selection of the channels; and determines a second probability value, included in the output, that the second selection is the optimal selection to be used for the transaction.

19. The action model device of claim 18, wherein the processor further:

if the first probability value is greater than the second probability value, generates an indication data that is indicative of the first selection being the optimal selection, wherein the first resource selection is the further resource or the first channel selection is the further channel.

20. The action model device of claim 11, wherein the resources comprise one of an automated response device, an agent device, a plurality of agent devices, a supervisor device, a plurality of supervisor devices, or a combination thereof.

* * * * *